United States Patent [19]

Gogniat et al.

[11] 4,372,160

[45] Feb. 8, 1983

[54] SPHERICAL INDICATORS FOR AIRCRAFT

[75] Inventors: Guy Gogniat, Linas; Jacques Grobois, Palaiseau, both of France

[73] Assignee: Societe de Fabrication d'Instruments de Mesure (S.F.I.M.), France

[21] Appl. No.: 206,530

[22] Filed: Nov. 13, 1980

[30] Foreign Application Priority Data

Nov. 20, 1979 [FR] France .................................. 79 28568

[51] Int. Cl.³ ............................................. G01C 21/00
[52] U.S. Cl. ................................................. 73/178 R
[58] Field of Search ............. 73/178 R, 178 T, 178 H; 116/DIG. 43, 249

[56] References Cited

U.S. PATENT DOCUMENTS 2,578,177 12/1951 Dehmel ................................ 116/284
2,737,640  3/1956 Barnaby ............................. 73/178 R
2,946,539  7/1960 Fischel ............................... 73/178 R
3,292,176 12/1966 Crane ................................. 73/178 R Primary Examiner—Donald O. Woodiel
Attorney, Agent, or Firm—Andrus, Sceales, Starke & Sawall

[57] ABSTRACT

A spherical indicator for use on board an aircraft comprises one or more pointers supported by members which are mounted to rotate in front of a sphere of the indicator. The member which supports a pointer is mounted to rotate about an axis which passes through the center of the sphere.

8 Claims, 3 Drawing Figures

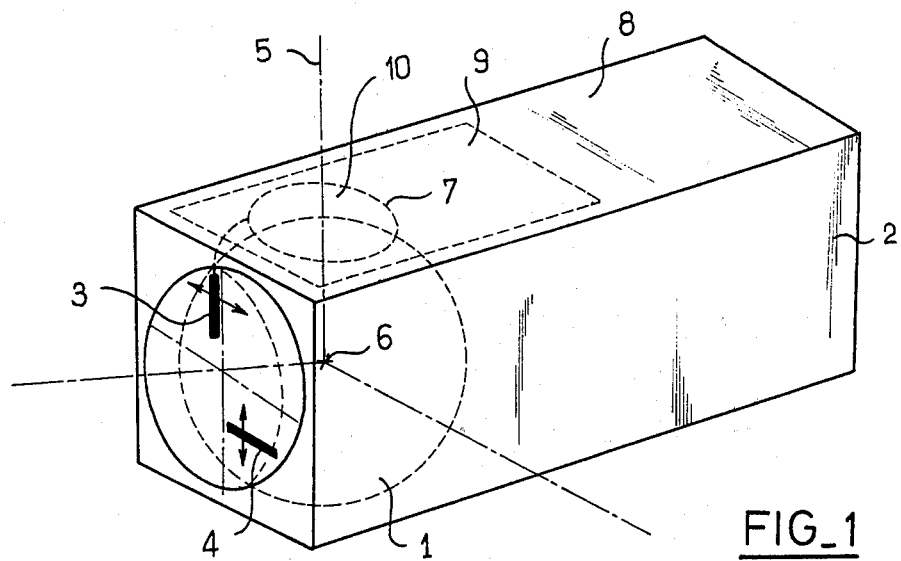
FIG_1
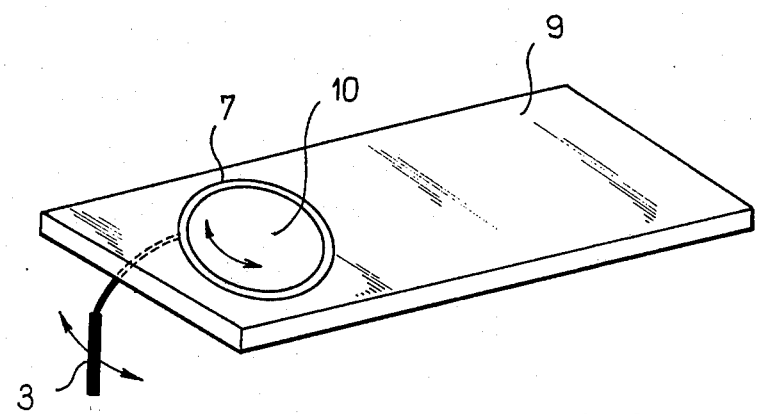
FIG_2

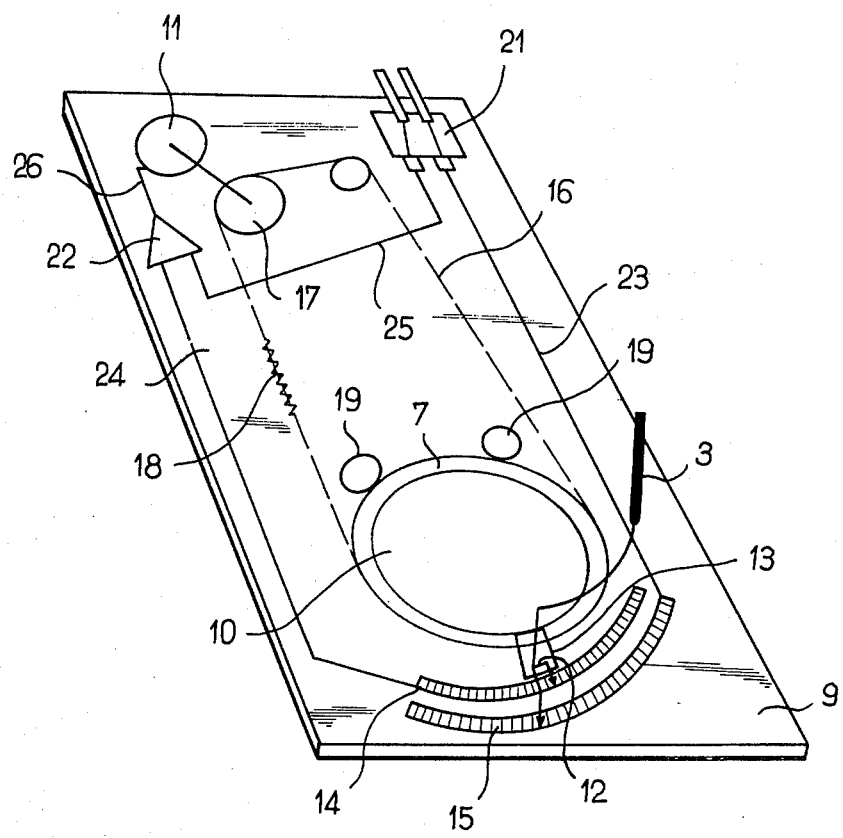
FIG_3

SPHERICAL INDICATORS FOR AIRCRAFT

The present invention relates to a spherical indicator for use on board an aircraft.

Such spherical indicators comprise a sphere representing the position of the aircraft with respect to space and a pair of pointers which are at right angles to each other. Each pointer is usually supported by a member which is mounted to rotate to move the pointers in front of the sphere in order to illustrate a variation between the position of the aircraft and a guide line.

Each pointer is generally mounted at one end of an elongated arm whereof the other end is integral with the movable arrangement of a galvanometer located at a distance from and at the rear of the sphere (with respect to the observer) and energised by a signal representative of the variation.

The object of the present invention is to provide a novel spherical indicator including novel means for supporting a pointer having several advantages with respect to known means.

According to the present invention there is provided a spherical indicator for the position of an aircraft, comprising a pointer supported by a member which is mounted to rotate whereby the pointer can move in front of a sphere in order to illustrate a variation between the position of the aircraft and a guide line, said member being mounted to rotate about an axis which passes through the centre of the sphere.

One advantage of the invention is that it does not alter the overall dimensions of the spherical indicator in comparison to known indicators.

A further advantage of the invention is that the spherical indicator is less sensitive to vibrations than known indicators.

The present invention will now be described by way of example with reference to the accompanying drawings in which:

FIG. 1 is a diagrammatic perspective view of a spherical indicator according to the invention;

FIG. 2 is a diagrammatic view of the pointer support device of the spherical indicator; and FIG. 3 is a detailed view of the pointer-support device.

FIG. 1 is a diagram which shows the sphere 1 of a spherical indicator mounted in manner known per se in a parallelepipedal box 2. Two pointers 3, 4 move in front of the sphere, the directions of which pointers intersect.

The invention relates to the mounting of one or both of the pointers and this mounting is described below with reference to the pointer 3 by way of example.

According to the invention, the pointer 3 is supported by a member which is mounted to rotate about an axis 5 passing through the centre 6 of the sphere.

Preferably, this member is a ring 7, for example a circular ring, centred on the axis 5 of the sphere.

By locating the ring substantially in a plane tangential to the sphere, it is possible to provide extra flat mounting on one side of the box, for example below the upper side 8 in the case illustrated. The pointer is fixed to the ring by any intermediate member, for example a plate the structure of which is immaterial to the present invention.

In a simple construction, the ring is mounted loosely in a cut-out 10 in a plate 9 attached below the side 8 of the box of the spherical indicator.

This plate is shown diagrammatically in broken line in FIG. 1, but is shown more clearly in FIG. 2, which shows it separated from the indicator, and more clearly still in FIG. 3, in which illustrates it is shown to an enlarged scale, detached from the recorder and in an inverted position.

The member which supports the pointer 3 is set in rotation by a motor 11. In the embodiment illustrated, the motor 11 is also mounted on the plate 9.

The device comprises control means 12, 14 for producing an electrical signal representative of the position of the pointer and a differential amplifier 22 whereof the inputs respectively receive an electrical signal representing the variation to be visualised and a signal representative of the position of the pointer and whereof the output controls said motor, such that the motor is inoperative when the pointer 3 is in the position representative of the value of the variation.

The control means comprise a potentiometer whereof the slider 12 is integral with the member or ring 7, this slider being fixed for example to the plate 13 which is attached to the ring and which supports the pointer. The slider 12 rubs against tracks 14, 15 which are concentric with respect to the ring 7.

The motor 11 drives the ring 7 through the intermediary of an endless belt 16 which comprises perforations 16 engaged by a pinion 17 rotated by the motor. The belt comes into contact with the ring over a portion of the circumference of the ring and is kept taut by a spring 18 (or any equivalent means). Under the effect of this tension, the ring 7 is subject to a pushing force and comes to bear against loosely mounted rollers 19.

The device comprises suitable electrical connections:

a connection 23 between a terminal of an input unit 21 and a track 15 of the potentiometer;

a connection 24 between the other track 15 of the potentiometer and one input of the differential amplifier;

a connection 25 between another terminal of the input unit 21 and the other input of the amplifier 22;

a connection 26 between the output of the amplifier 22 and the energising input of the motor 11.

The terminals of the input unit 21 are connected electrically to pins which, when the device is in place, cooperate with fixed pins of the box 2 in order to receive the electrical supply necessary for the operation of the motor 11 and the signal to be visualised.

In the vicinity of the sphere 1, the device occupies little space between the top of the sphere 1 and the upper wall 8 of the box of the sphere and likewise only the pointer-support arm passes between the sphere and the box.

In addition, the ring 7 is much less sensitive to vibrations than the pointer-support arm which must be relatively long, in the case of the galvanometric device, in order to connect the movable arrangement of the galvanometer located at quite a distance behind the sphere to the pointer located in front of the sphere 1.

Moreover, the pointer moves over a generatrix which is concentric with respect to the shere 1, which prevents errors of parallax whereas in the case of the galvanometric mounting, the pointer moves along a portion of a circle whereof the centre is far behind the sphere.

By calculating the vibration of the resistance of the track 14 in a suitable manner, the control makes it possible to achieve displacement of the pointer as a chosen function and in particular a non-linear function of the variation, which makes it possible to increase the sensitivity in the vicinity of zero.

What is claimed is:

1. A spherical indicator for the position of an aircraft, comprising a pointer, a member supporting the pointer which member is mounted to rotate whereby the pointer can move in front of a sphere in order to illustrate a variation between the position of the aircraft and a guide line, said member being mounted to rotate about an axis which passes through the centre of the sphere, said member comprising a ring centered on an axis of the sphere, and said ring being located substantially in a plane tangential to the sphere.

2. A spherical indicator as claimed in claim 1, in which said ring is mounted loosely in a cut-out defined by a plate attached to the spherical indicator.

3. A spherical indicator as claimed in claim 1, in which said ring bears laterally against rollers.

4. A spherical indicator as claimed in claim 1, in which the ring is set in rotation by a belt which travels under the action of a motor.

5. A spherical indicator as claimed in claim 4, in which the belt contacts the ring and means are provided for imparting tension to the belt, rollers being provided to serve as a lateral support for the ring under the action of this tension.

6. A spherical indicator as claimed in claim 1, which further comprises a motor, a transmission unit between this motor and said member in order that the motor sets the member in rotation, control means for producing an electrical signal representative of the position of the pointer, and a differential amplifier whereof the inputs respectively receive an electrical signal representative of the variation to be illustrated and a signal representative of the position of the pointer and whereof the output controls said motor, so that the motor is inoperative when the pointer is in the position representative of the value of the variation.

7. A spherical indicator as claimed in claim 6, in which the control means comprise a potentiometer whereof the slide is integral with said member and whereof the track extends over a circle whose centre is located on said axis.

8. A spherical indicator as claimed in claim 1, in which the member and a motor which drives the latter are both mounted on a plate attached on one side of the spherical indicator.

* * * * *